United States Patent
Eickhoff et al.

(10) Patent No.: US 9,525,808 B2
(45) Date of Patent: Dec. 20, 2016

(54) CAMERA ARRANGEMENT FOR A MOTOR VEHICLE

(71) Applicant: Leopold Kostal GmbH & Co. KG, Luedenscheid (DE)

(72) Inventors: Marcus Eickhoff, Balve (DE); Gregor Boehne, Castrop-Rauxel (DE); Frank Blaesing, Werl (DE); Ralf Boebel, Holzwickede (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 386 days.

(21) Appl. No.: 13/772,819

(22) Filed: Feb. 21, 2013

(65) Prior Publication Data

US 2013/0162827 A1    Jun. 27, 2013

Related U.S. Application Data

(63) Continuation of application No. PCT/EP2012/050793, filed on Jan. 19, 2012.

(30) Foreign Application Priority Data

Jan. 21, 2011 (DE) .................. 10 2011 009 075

(51) Int. Cl.
*H04N 5/225* (2006.01)
*B60R 11/04* (2006.01)
(Continued)

(52) U.S. Cl.
CPC .............. *H04N 5/2254* (2013.01); *B60R 11/04* (2013.01); *G02B 27/0062* (2013.01);
(Continued)

(58) Field of Classification Search
CPC .................. H04N 5/2254; B60R 11/04; B60R 2011/0026; G02B 27/0062; G02B 27/16; G02B 27/12; G03B 15/00
(Continued)

(56) References Cited

U.S. PATENT DOCUMENTS 5,208,674 A * 5/1993 Setchell, Jr. .................. 348/269
5,513,201 A * 4/1996 Yamaguchi ............ G02B 6/425
                                                                372/70
(Continued)

FOREIGN PATENT DOCUMENTS

CN          1946592 A       4/2007
DE     102004024735 A1     12/2005
(Continued)

OTHER PUBLICATIONS

The International Bureau of WIPO, International Preliminary Report on Patentability for the corresponding PCT/EP2012/050793 mailed Jul. 23, 2013.
(Continued)

*Primary Examiner* — Tung Vo
*Assistant Examiner* — Zaihan Jiang
(74) *Attorney, Agent, or Firm* — Brooks Kushman P.C.

(57) ABSTRACT

A camera arrangement includes a camera and a prism. The camera includes a camera sensor having an array of pixels. The prism is arranged between a window pane such as a vehicle windshield and the camera sensor. Optical properties of the camera sensor and the prism are matched to one another such that a maximum broadening of a light beam due to dispersion of the prism lies within one pixel of the camera sensor.

14 Claims, 2 Drawing Sheets

(51) Int. Cl.
- *G02B 27/00* (2006.01)
- *G03B 15/00* (2006.01)
- *G02B 27/12* (2006.01)
- *G02B 27/16* (2006.01)
- *B60R 11/00* (2006.01)

(52) U.S. Cl.
CPC ............. *G02B 27/12* (2013.01); *G02B 27/16* (2013.01); *G03B 15/00* (2013.01); *B60R 2011/0026* (2013.01)

(58) Field of Classification Search
USPC ........................................................ 348/148
See application file for complete search history.

(56) References Cited

U.S. PATENT DOCUMENTS

| | | | | |
|---|---|---|---|---|
| 5,900,982 | A * | 5/1999 | Dolgoff | H04N 13/0459 348/E13.014 |
| 6,156,684 | A * | 12/2000 | Sato et al. | 501/45 |
| 6,166,764 | A * | 12/2000 | Sakata | B60R 1/00 348/148 |
| 6,485,625 | B1 * | 11/2002 | Simpson et al. | 204/601 |
| 6,816,625 | B2 * | 11/2004 | Lewis et al. | 382/275 |
| 7,322,755 | B2 | 1/2008 | Neumann et al. | |
| 7,408,641 | B1 * | 8/2008 | Kwak et al. | 356/369 |
| 2001/0035904 | A1 * | 11/2001 | Imoto | 348/148 |
| 2002/0190231 | A1 * | 12/2002 | Kobayashi | B60S 1/0822 250/573 |
| 2003/0058440 | A1 * | 3/2003 | Scott et al. | 356/318 |
| 2005/0041313 | A1 * | 2/2005 | Stam et al. | 359/877 |
| 2006/0279846 | A1 * | 12/2006 | Ring | G02B 27/145 359/634 |
| 2007/0041725 | A1 | 2/2007 | Neumann et al. | |
| 2007/0268590 | A1 * | 11/2007 | Schwerdtner | 359/619 |
| 2011/0272596 | A1 * | 11/2011 | Haga et al. | 250/458.1 |
| 2011/0285995 | A1 * | 11/2011 | Tkaczyk et al. | 356/326 |
| 2012/0002049 | A1 * | 1/2012 | Fry et al. | 348/148 |
| 2012/0113506 | A1 * | 5/2012 | Gmitro et al. | 359/385 |
| 2012/0126142 | A1 * | 5/2012 | Matsui et al. | 250/459.1 |

FOREIGN PATENT DOCUMENTS

| | | |
|---|---|---|
| DE | 102008020954 A1 | 10/2009 |
| DE | 102008027307 A1 | 12/2009 |
| JP | 2003265402 A | 9/2003 |

OTHER PUBLICATIONS

Germany Patent Office, German Patent Office Search Report for corresponding DE 10 2011 009 075,4 dated Oct. 20, 2011.
European Patent Office, International Search Report for corresponding PCT/EP2012/050793 mailed Jun. 29, 2012.
Anonymous (Encyclopedia of Physics): Resolutions limit, Jan. 1, 1998 (Jan. 1, 1998), Retrieved from the Internet: URL: http://www.wissenschaft-online.de/abo/lexikon/physik/960 [retrieved on Feb. 7, 2013] (machine translated from German to English).
Anonymous (Encyclopedia of Physics): Resolution, Jan. 1, 1998 (Jan. 1, 1998), Retrieved from the Internet: URL: http://www.wissenschaft-online.de/abo/lexikon/physik/961 [retrieved on Feb. 7, 2013] (machine translated from German to English).
The State Intellectual Property Office of People's Republic of China, Search Report for the corresponding Chinese Patent Application No. 201280006002, dated May 19, 2015, Machine English translation.
The State Intellectual Property Office of People's Republic of China, First Office Action for the corresponding Chinese Patent Application No. 201280006002 dated May 27, 2015, Machine English translation.
The State Intellectual Property Office of People's Republic of China, Second Office Action for the corresponding Chinese Patent Application No. 201280006002 dated Jan. 12, 2016, Machine English translation.

* cited by examiner

CAMERA ARRANGEMENT FOR A MOTOR VEHICLE

CROSS-REFERENCE TO RELATED APPLICATIONS

This application is a continuation of International Application No. PCT/EP2012/050793, published in German, with an International filing date of Jan. 19, 2012, which claims priority to DE 10 2011 009 075.4, filed Jan. 21, 2011; the disclosures of which are incorporated in their entirety by reference herein.

TECHNICAL FIELD

The present invention relates to a camera arrangement having a camera and a light beam guide such as a prism in which the camera is arranged in a vehicle interior behind a vehicle windshield, the light beam guide is positioned between the windshield and the camera, and the camera has an electronic camera sensor including a pixel array.

BACKGROUND

DE 10 2008 020 954 A1 describes such a camera arrangement. Camera arrangements having a camera looking through a vehicle windshield are used for lane detection, traffic sign recognition, and the like. In modern vehicles, the windshield (i.e., a vehicle window pane) is positioned at a relatively shallow angle (e.g., between 20° and 25°) with respect to the horizon for aerodynamic and aesthetic reasons. This can cause a light beam incident in a horizontal direction to be strongly refracted upon entering the windshield from the vehicle exterior and to again be strongly refracted upon exiting the windshield into the vehicle interior. A light beam guide such as a prism-type light conductor can be coupled without refraction, or with only an insignificant amount of refraction, to the inner side of the windshield so that the beam path is modified advantageously. Such light beam guides can nevertheless give rise to geometrical distortions and disturbing color defects.

Such geometrical distortions include compressive deformations or elongations as well as warping of the camera image. They are relatively unproblematic as they can be removed computationally after the fact. On the other hand, compensation for color errors in prism arrangements can be relatively tedious. In many cases, the prism arrangement includes multiple prisms, which are made of different and sometimes expensive materials or which are to be arranged in geometrically complex ways with respect to one another.

SUMMARY

An object of the present invention includes a relatively simple and cost effective generic camera arrangement for a vehicle in which the camera arrangement is accompanied by no or only slight color distortions.

In carrying out at least one of the above and other objects, the present invention provides a camera arrangement having a camera and a prism. The camera includes a camera sensor having an array of pixels. The prism is arranged between a window pane and the camera sensor. Optical properties of the camera sensor and the prism are matched to one another such that a maximum broadening of a light beam due to dispersion of the prism lies within one pixel of the camera sensor.

Further, in carrying out at least one of the above and other objects, the present invention provides a camera arrangement for a vehicle. This camera arrangement also includes a camera and a prism. The camera is arranged behind a windshield inside the vehicle. The camera has an electronic camera sensor with a pixel array. The prism is arranged between the windshield and the camera. Optical properties of the camera and the prism are matched to one another so that a maximum beam divergence caused by dispersion of the prism within a wavelength range detectable by the camera lies within one pixel dimension of the pixel array of the camera sensor.

A camera arrangement for a vehicle in accordance with embodiments of the present invention includes a camera and a light beam guide. The camera is located in the vehicle interior behind a vehicle window pane (e.g., the vehicle windshield). The light beam guide is positioned between the window pane and the camera. The light beam guide is a prism or has or forms a prism. The camera has an electronic camera sensor including a pixel array. Optical characteristics of the camera and the prism are adjusted to each other such that the maximum beam divergence caused by the dispersion of the prism within the wavelength range recorded by the camera on the camera sensor lies within a pixel size of the pixel array.

Put another way, the optical properties of the camera and the prism are matched to one another such that the maximum beam broadening caused by the wavelength regions that are detected due to dispersion of the prism inside the camera lie within one pixel dimension of the pixel array on the camera sensor.

The camera arrangement can be manufactured in a relatively cost effective manner as the camera arrangement includes a single prism as opposed to multiple prisms.

The matching of the optical properties of the camera and the prism is based on the consideration that lack of sharpness or color distortions due to dispersion of the prism are only detectable when a point on an object picked up by the camera is imaged on multiple pixels of the camera sensor. Aberrations caused by optical elements are thus undetectable as long as they are smaller than the pixel size.

The optically effective surfaces of an optical prism are normally so flat that no detectable error results from residual surface roughness. The material of an optical prism is furthermore so homogeneous that no detectable error results.

Thus, when a simple prism (in contrast to a dispersion-compensated arrangement of multiple prisms) is used in front of the lens or objective of the camera, degradation in the aberration quality is expected, primarily due to the dispersion properties of the prism material. Different wavelengths are deflected differently by the prism so that the angles of incidence on the camera sensor are also different. In order that the light beams of all wavelengths relevant for producing an image point are imaged sufficiently well on a single pixel, the prism angle has to be small enough so that the difference of the angle of incidence on the camera sensor remains below the specified resolution limit.

The optical properties of the camera and the prism are thus matched appropriately to one another in accordance with embodiments of the present invention. Here, on the prism side, the index of refraction of the prism material and its variation (dispersion relation) over the wavelength region of the light detected by the camera sensor, as well as the value of the prism angle, are the same. On the camera side, the size and spacing of the pixels on the camera sensor is particularly relevant.

These values are matched to one another so that the maximum possible beam broadening due to dispersion of the prism cannot be larger than one pixel of the camera sensor. In particular, the prism angle is deliberately selected so that the desired prism effect, and thus the light beam deflection or geometric deformation, for example, is as large as possible, but the point broadening due to chromatic aberration at the camera sensor is still sufficiently small.

The above features, and other features and advantages of the present invention are readily apparent from the following detailed description thereof when taken in connection with the accompanying drawings.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
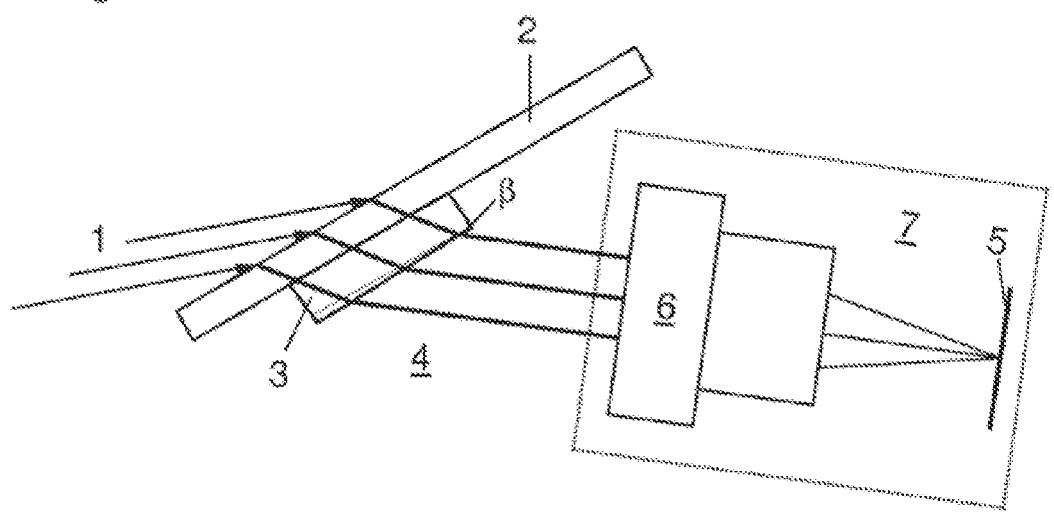
FIG. 1 illustrates a schematic depiction of a camera arrangement in accordance with an embodiment of the present invention.

Referring now to FIG. 1, a camera arrangement in accordance with an embodiment of the present invention is shown. FIG. 1 is intended to illustrate the arrangement in principle of the components of the camera arrangement. The configuration and operating principle are clarified here as a matter of precedence. Thus, the components shown in FIG. 1 are depicted neither precisely to scale nor in proper angular relationships with respect to one another as compared to an actual physical implementation.

The camera arrangement includes a camera 7 and a prism 3. Camera 7 is arranged to look through a vehicle window pane 2 (e.g., a vehicle windshield). Thus, camera 7 captures light from outside windshield 2. In this process, light beams along beam path 1 pass from windshield 2 directly to prism 3 and from prism 3 to camera 4 through an optical medium 4 located between prism 3 and camera 7. For simplicity, it is assumed that optical medium 4 is air.

Camera 7 includes at least one camera objective 6 and a light recording camera sensor 5. Camera objective 6 thereby has at least one focusing active lens. Additional optical, electronic, and mechanical components can likewise be components of camera 7, including in particular a housing part.

In order to illustrate the beam path the paths of three incident parallel light beams 1 are depicted in FIG. 1. Light beams 1 impinge approximately horizontally on the outside of windshield 2. Windshield 2 is sloped with respect to the direction of incidence. When light beams 1 enter windshield 2 the light beams are refracted toward the normal to windshield 2.

Prism 3 is located on the inside of windshield 2. Prism 3 preferably has the same or similar index of refraction as windshield 2 and is optically coupled to windshield 2 so that practically no angular deflection of light beam 1 occurs in the transition region between windshield 2 and prism 3. Light beams 1, which are still parallel to one another after passing through prism 3, are focused by camera objective 6 onto camera sensor 5 of camera 7.

Prism 3 shown in FIG. 1 has a relatively small prism angle β. Prism 3 thus does not have the wedge shape that is typical of prisms. Instead, prism 3 is formed as a plate having non-parallel surfaces. Prism 3 can be considered to be an integral combination of (i) a plane parallel plate and (ii) a relative sharply angled prism taper. Prism angle β for prism 3 shown in FIG. 1 is about 2°.

Figure 2:
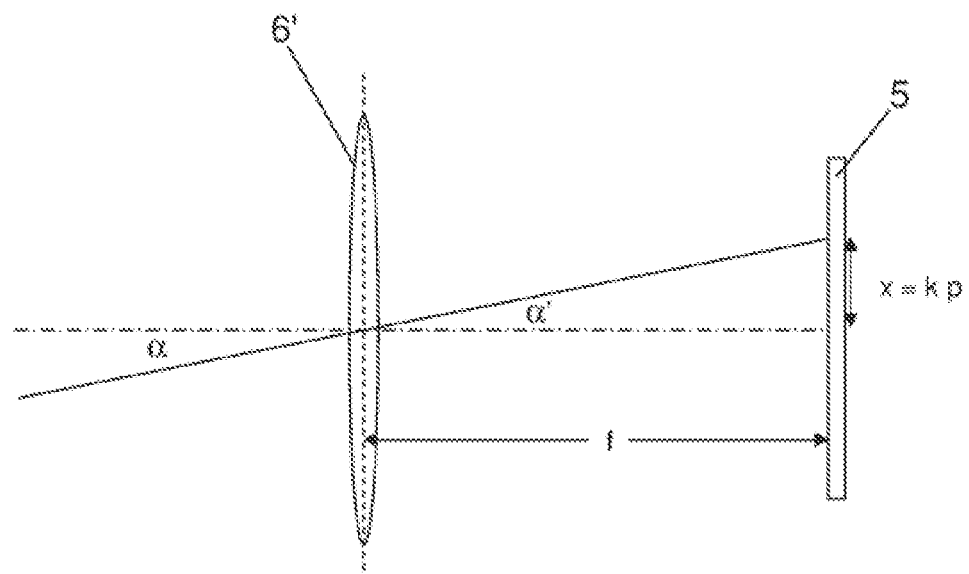
FIG. 2 illustrates a sketch showing the resolution capability of a camera sensor.

FIG. 2 illustrates the resolution capability of camera sensor 5. A single lens 6' is shown in place of camera objective 6. The principal plane of lens 6' and the optical axis of camera 7 are shown as dashed lines. Camera sensor 5 is shown in cross section at a distance from the focal point of lens 6'—that is, camera sensor 5 is a focal length f apart from lens 6'. Camera sensor 5 includes a pixel array (not shown in detail) having the pixel size p. That is, each pixel of the pixel array of camera sensor 5 has the same pixel size (or pixel dimension) p.

As shown in FIG. 2, a light beam incident on lens 6' at an angle α with respect to the optical axis as the mid-point beam passes without diffraction at the same angle α' with respect to the optical axis to the surface of camera sensor 5. The light beam is imaged on the $k^{th}$ pixel of camera sensor 5.

The following relationship can be obtained from FIG. 2: tan α'=x/f=k p/f.

A numerical example of an angle α'=1°, a focal length f=10 mm, and a pixel size p=10 μm yields tan 1°=k*0.010/10, with k being calculated to be 17.455. Thus, in this example, the camera resolution is n=17.455 pixels per degree for small angles α'.

Figure 3:
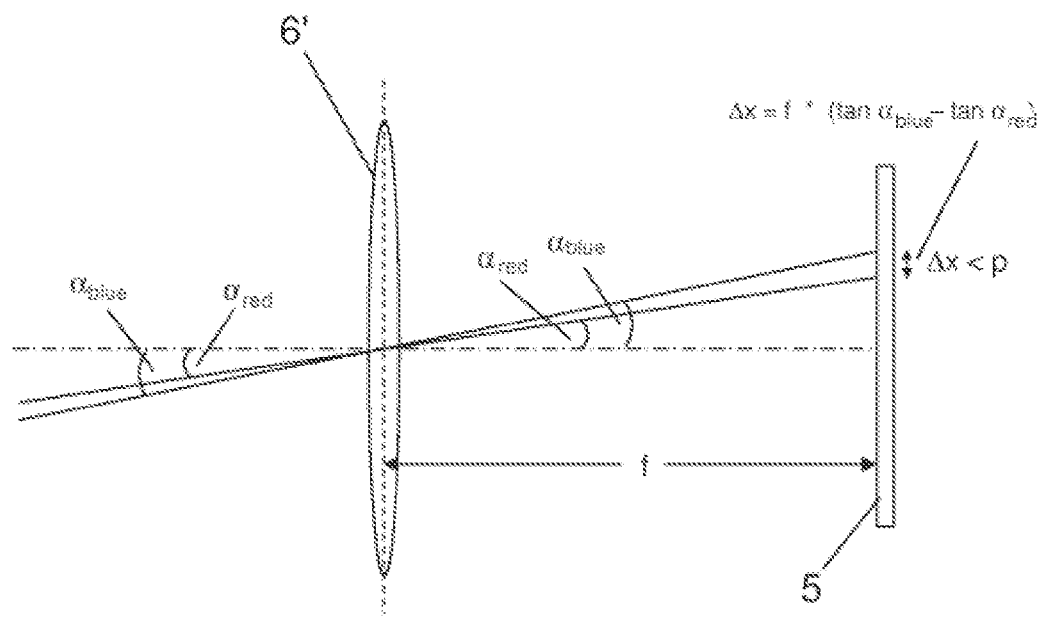
FIG. 3 illustrates a sketch showing beam broadening by dispersion through the prism material.

The principle of the camera arrangement is explained as follows with the aid of FIG. 3. FIG. 3 illustrates a sketch showing beam broadening by dispersion through the prism material. FIG. 3 shows the origin of color aberrations, in a highly simplified and purely qualitative representation, for an arrangement having one prism.

Incident light falling on the prism (not shown in FIG. 3) is decomposed into the spectral colors contained in the light in a well-known manner based on the dispersion properties of the prism material. For example, if white light is incident on the prism at a specified angle, then the various colors or wavelengths exit the prism at different angles of deflection. The angular region covered here can be estimated for visible light by the angular deflection $α_{blue}$ of the most highly diffracted short wavelength light and the angular deflection $α_{red}$ of the most weakly diffracted long wavelength light.

However, it is not the spectrum of the incident light that is of relevance for the camera arrangement. Rather, only the light that can be detected by the camera arrangement is of relevance. Based on the transmission properties of windshield 2 and/or lens 6' (i.e., camera objective 6) and the spectral sensitivity of camera chip 5, the spectrum of the detected light is reduced in comparison to the normal incident light. Thus, $α_{blue}$ and $α_{red}$ correspond to the deflection angles of the light having the shortest and longest detectable wavelengths.

The numerical values obtained for these deflection angles depend on the dispersion relationship of the prism material used and the geometry of prism 3, and on the angle of incidence of the light on prism 3. The numerical values can be determined for the specific arrangement either computationally or experimentally.

Due to the angular splitting, the dispersion-broadened beam is thereby imaged on camera sensor 5 over a width of:

$$\Delta x = (\tan \alpha_{blue} - \tan \alpha_{red}) * f.$$

In order to assure that the dispersion of prism 3 does not cause a problem, the components of the camera arrangement are matched to one another so that the dispersion broadening remains smaller than the pixel size p of camera sensor 5:

$$(\tan \alpha_{blue} - \tan \alpha_{red}) * f < p.$$

This can be achieved by selecting the material of prism 3, the geometry of prism 3, the spectral properties of the camera arrangement, and the resolving power of camera sensor 5. The resolution that is determined from pixel size p provides a meaningful limitation for the overall camera optical system. Lens 6' (and objective 6) need not have a resolution smaller than pixel size p. Errors arising in other optical elements are thus irrelevant as long as the total aberrations are smaller than the pixel size.

As described, the camera arrangement thus avoids chromatic distortion without requiring compensating measures involving intricate multicomponent prism arrangements.

REFERENCE SYMBOLS

1 light beams (optical path)
2 vehicle window pane
3 prism
4 optical medium
5 camera sensor
6 (camera) objective
6' lens
7 camera
$\alpha, \alpha'$ angle
$\alpha_{red}, \alpha_{blue}$ deflection angle
$\beta$ prism angle
f focal length
k number of pixels
p pixel size
x distance While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. A camera arrangement comprising:
   a camera including a camera sensor having an array of pixels, wherein each pixel of the camera sensor has the same pixel size p;
   a single prism of a homogeneous material, the prism having a right-angled trapezoid form including an integral combination of (i) a plane parallel plate having parallel first and second main surfaces and (ii) an angled prism taper adjacent the second main surface of the plane parallel plate, the angled prism taper having a prism angle ($\beta$) relative to the second main surface of the plane parallel plate, the first main surface of the plane parallel plate and the angled prism taper each constituting a respective portion of a perimeter of the right-angled trapezoid form, the prism being arranged between a window pane and the camera with the plane parallel plate being between the window pane and the angled prism taper, the first main surface of the plane parallel plate facing towards the window pane, the angled prism taper facing towards the camera, and the first main surface of the plane parallel plate and the angled prism taper both being oblique to an optical axis of the camera;
   wherein the camera further includes a camera objective, the camera objective being arranged between the prism and the camera sensor, the camera objective being at a focal length f apart from the camera sensor;
   wherein optical properties of the camera sensor and the prism including the prism angle ($\beta$) are matched to one another such that a maximum broadening of a light beam due to dispersion of the prism lies within one pixel of the camera sensor; and
   wherein the prism angle ($\beta$), the focal length f, and the pixel size p are matched to one another such that $((\tan \alpha_{blue} - \tan \alpha_{red}) * f) < p$ for each point on the camera sensor whereby optical properties of the camera sensor and the prism are matched to one another such that maximum broadening of a light beam due to dispersion of the prism lies within one pixel of the camera sensor, wherein $\alpha_{blue}$ and $\alpha_{red}$ designate deflection angles at which a point of an object to be imaged on the camera sensor is formed for maximal short wavelength light, which $\alpha_{blue}$ corresponds to, and maximal long wavelength light, which $\alpha_{red}$ corresponds to, from a wavelength region detected on the camera sensor.

2. The camera arrangement of claim 1 wherein:
   the prism angle ($\beta$) is at an angular value which enables the maximum broadening of the light beam due to dispersion of the prism to lie within one pixel of the camera sensor.

3. The camera arrangement of claim 1 wherein:
   the prism angle ($\beta$) has a maximum value of 4° relative to the plane parallel plate.

4. The camera arrangement of claim 1 wherein:
   the prism angle ($\beta$) is smaller than a prism angle threshold to enable the maximum broadening of the light beam due to dispersion of the prism to lie within one pixel of the camera sensor.

5. The camera arrangement of claim 1 wherein:
   each pixel of the camera sensor has the same pixel size;
   wherein the pixel size is an optical property of the camera sensor and is large enough to enable the maximum broadening of the light beam due to dispersion of the prism to lie within one pixel of the camera sensor.

6. The camera arrangement of claim 1 wherein:
   the camera objective includes a single lens.

7. The camera arrangement of claim 1 wherein:
   the first main surface of the plane parallel plate is coupled to the window pane.

8. The camera arrangement of claim 7 wherein:
   the prism has an index of refraction substantially similar to an index of refraction of the window pane.

9. The camera arrangement of claim 1 wherein:
   the window pane is a vehicle windshield.

10. A camera arrangement for a vehicle, the camera arrangement comprising:
    a camera arranged behind a windshield inside the vehicle, the camera having an electronic camera sensor with a pixel array;
    a single prism of a homogeneous material, the prism having a right-angled trapezoid form including an integral combination of (i) a plane parallel plate having parallel first and second main surfaces and (ii) an angled prism taper adjacent the second main surface of the plane parallel plate, the angled prism taper having a prism angle ($\beta$) relative to the second main surface of the plane parallel plate, the first main surface of the plane parallel plate and the angled prism taper each constituting a respective portion of a perimeter of the right-angled trapezoid form, the prism being arranged between the windshield and the camera with the plane parallel plate being between the windshield and the angled prism taper, the first main surface of the plane parallel plate facing towards the windshield, the angled prism taper facing towards the camera, and the first main surface of the plane parallel plate and the angled prism taper both being oblique to an optical axis of the camera;

wherein the camera further includes a camera objective, the camera objective being arranged between the prism and the camera sensor, the camera objective being at a focal length f apart from the camera sensor;

wherein optical properties of the camera and the prism including the prism angle ($\beta$) are matched to one another so that a maximum beam divergence caused by dispersion of the prism within a wavelength range detectable by the camera lies within one pixel dimension of the pixel array of the camera sensor; and wherein the prism angle ($\beta$) of the prism, the focal length f, and the pixel dimension (p) of the pixel array of the camera sensor are matched to one another such that $((\tan \alpha_{blue} - \tan \alpha_{red})*f) < p$ for each point on the camera sensor whereby optical properties of the camera and the prism are matched to one another such that the maximum beam divergence lies within one pixel dimension of the pixel array of the camera sensor, wherein $\alpha_{blue}$ and $\alpha_{red}$ designate deflection angles at which a point of an object to be imaged on the camera sensor is formed for maximal short wavelength light, which $\alpha_{blue}$ corresponds to, and maximal long wavelength light, which $\alpha_{red}$ corresponds to, from the detectable wavelength range.

11. The camera arrangement of claim 10 wherein:
the wavelength range detectable by the camera corresponds to the visible wavelength range of the human eye.

12. The camera arrangement of claim 10 wherein:
the prism angle ($\beta$) is at an angular value which enables the maximum beam divergence to lie within one pixel dimension of the pixel array of the camera sensor.

13. The camera arrangement of claim 10 wherein:
the pixel dimension is an optical property of the camera and is large enough to enable the maximum beam divergence to lie within one pixel dimension of the pixel array of the camera sensor.

14. The camera arrangement of claim 10 wherein:
the prism has an index of refraction substantially similar to an index of refraction of the windshield.

* * * * *